US011516286B2

(12) United States Patent
Kipp et al.

(10) Patent No.: US 11,516,286 B2
(45) Date of Patent: Nov. 29, 2022

(54) MANAGING SERVICE CAPACITY

(71) Applicant: Comcast Cable Communications, LLC, Philadelphia, PA (US)

(72) Inventors: Neill Kipp, Centennial, CO (US); Joseph Kiok, Arcadia, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/368,290

(22) Filed: Mar. 28, 2019

(65) Prior Publication Data

US 2020/0314177 A1 Oct. 1, 2020

(51) Int. Cl.
*H04L 67/1036* (2022.01)
*H04L 67/1023* (2022.01)
*H04L 9/14* (2006.01)
*H04L 9/40* (2022.01)
*H04L 61/4511* (2022.01)

(52) U.S. Cl.
CPC ............ *H04L 67/1036* (2013.01); *H04L 9/14* (2013.01); *H04L 61/4511* (2022.05); *H04L 63/06* (2013.01); *H04L 67/1023* (2013.01)

(58) Field of Classification Search
CPC ... H04L 67/1036; H04L 67/1023; H04L 9/14; H04L 61/1511; H04L 63/06
USPC ........................................................ 709/223
See application file for complete search history.

(56) References Cited

U.S. PATENT DOCUMENTS 6,671,259 B1 * 12/2003 He .................... H04L 67/1008
370/235
9,807,016 B1 * 10/2017 Sarangapani ......... H04L 47/125
2001/0014158 A1 * 8/2001 Baltzley ............... G06Q 20/401
705/51
2003/0023744 A1 * 1/2003 Sadot ..................... H04L 67/02
709/234
2006/0089996 A1 * 4/2006 Peiffer ................ H04L 67/1002
709/227

(Continued)

FOREIGN PATENT DOCUMENTS

EP        2398211 B1 * 11/2013    ....... H04L 29/12066
WO    WO-03019901 A1 *  3/2003    ............. H04L 67/14

OTHER PUBLICATIONS

Townsendsecurity, The Definitive Guide to Encryption Key Management Fundamentals, Feb. 19, 2017, https://web.archive.org/web/20170219094818/https://info.townsendsecurity.com/definitive-guide-to-encryption-key-management-fundamentals (Year: 2017).*

(Continued)

*Primary Examiner* — Zi Ye

(74) *Attorney, Agent, or Firm* — Banner & Witcoff, Ltd.

(57) ABSTRACT

Systems, apparatuses, and methods are described for adjusting capacity in a networking environment. A networking system comprising clients, servers, load balancers, and/or other devices may expand and contract network capacity as needed. When expanding network capacity, load balancers may instruct client devices to connect to servers that are part of the expanded network. When network capacity is reduced, a server and/or a load balancer my instruct client devices to close a connection with a first server and establish a connection with a second server. Client devices may seamlessly begin using the connection with a second server without having to wait for a connection timeout with the first server.

23 Claims, 12 Drawing Sheets

(56) References Cited

U.S. PATENT DOCUMENTS

| | | | | |
|---|---|---|---|---|
| 2007/0094373 | A1* | 4/2007 | Brendel | H04L 67/1001 709/223 |
| 2009/0006884 | A1* | 1/2009 | Cahill | H04L 41/0663 714/4.1 |
| 2011/0231651 | A1* | 9/2011 | Bollay | H04L 63/0245 713/152 |
| 2012/0272058 | A1* | 10/2012 | Wang | H04L 63/166 713/156 |
| 2013/0145367 | A1* | 6/2013 | Moss | H04L 41/0896 718/1 |
| 2015/0356161 | A1* | 12/2015 | Slavicek | G06F 16/22 707/636 |
| 2016/0308845 | A1* | 10/2016 | Quinlan | H04L 9/3247 |

OTHER PUBLICATIONS

Justin Ellingwood, Understanding the SSH Encryption and Connection Process, Oct. 22, 2014, digitalocean.com, https://www.digitalocean.com/community/tutorials/understanding-the-ssh-encryption-and-connection-process (Year: 2014).*

"Transmission Control Protocol," DARPA Internet Program Protocol Specification, Information Sciences Institute, University of Southern California, https://tools.ietf.org/html/rfc793, Sep. 1981.

P. Mockapetris, "Domain Names—Concepts and Facilities," Network Working Group, https://www.ietf.org/rfc/rfc1034.txt, Nov. 1987.

T. Berners-Lee, R. Fielding, H. Frystyk, "Hypertext Transfer Protocol—HTTP/1.0," Network Working Group, https://tools.ietf.org/html/rfc1945, May 1996.

T. Dierks, E. Rescorla, "The Transport Layer Security (TLS) Protocol Version 1.2," Network Working Group, https://tools.ietf.org/html/rfc5246, Aug. 2008.

"IPERF," Wikipedia, https://en.wikipedia.org/wiki/Iperf, Jun. 19, 2019.

"Network Traffic Measurement," Wikipedia, https://en.wikipedia.org/wiki/Network_traffic_measurement, Jan. 8, 2019.

* cited by examiner

MANAGING SERVICE CAPACITY

BACKGROUND

Networking environments may experience varying loads that may be difficult to predict. Adjusting a networking environment's capacity to respond to increasing or decreasing demand in an efficient manner may be difficult. Dynamically changing cloud-based application service infrastructure with elasticity and bursting presents further problems in this regard. During a service increase, client devices should be quickly routed to newly available capacity to avoid having infrastructure sit idle. During a service decrease, servers should be drained of their client connections and quickly shut down without negatively impacting client devices. Many cloud protocols do not work gracefully in a dynamic cloud infrastructure and pose problems draining sessions, such as HyperText Transfer Protocol (HTTP) sessions, gracefully when not initiated by a client. If a server shuts down without warning, for example, a client must wait for a timeout before continuing. As another example, clients must restart all Transmission Control Protocol (TCP) connections to a server when the server address changes. These and other shortcomings are identified and addressed in the disclosure.

SUMMARY

The following summary presents a simplified summary of certain features. The summary is not an extensive overview and is not intended to identify key or critical elements.

Systems, apparatuses, and methods are described for managing and adjusting capacity in a networking environment. A networking system comprising clients, servers, load balancers, and/or other devices may expand and contract network capacity as needed. During expansion and contraction, computing resources may be allocated efficiently and may reduce startup latency. A server may report, to a load balancer, as active at a regular reporting interval. If the server fails to report, the load balancer may notify clients that have established connections with the server that the server is no longer active. Thus, client timeout while waiting on a server that is not active may be shortened to the regular reporting interval instead of some longer default timeout. Further, a connection handshake between a client device and a server may be combined with a client/server key exchange. Combining the connection handshake with the key exchange may improve efficiency by removing the Transport Layer Security (TLS) data exchanges that are performed after connection handshakes are completed. In addition, a load balancer (LB) may combine routing and load balancing into one host, which may eliminate one network hop for network traffic, saving connection latency.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
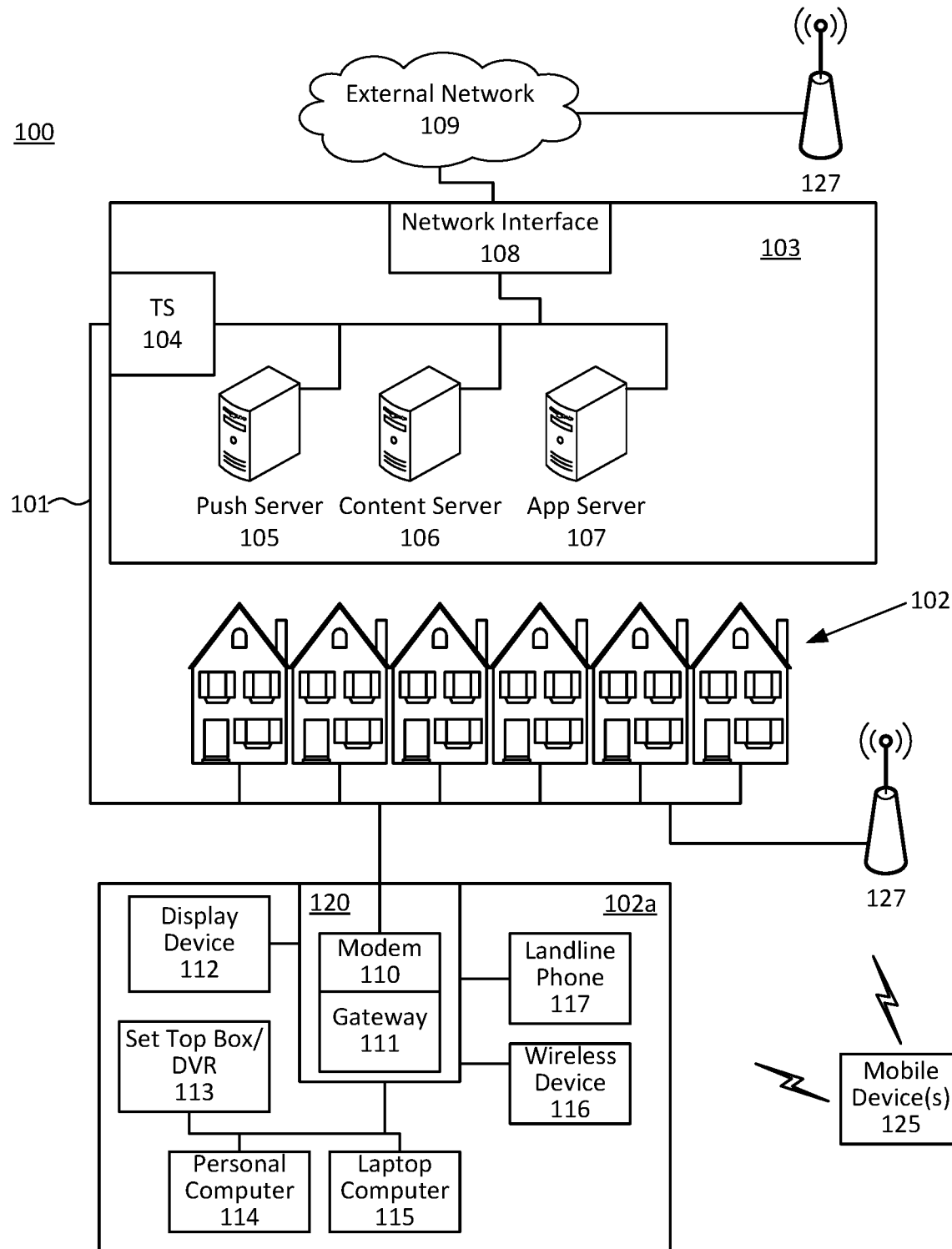
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional push, content, and/or application servers, and/or other types of servers. Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), a twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth, etc.), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
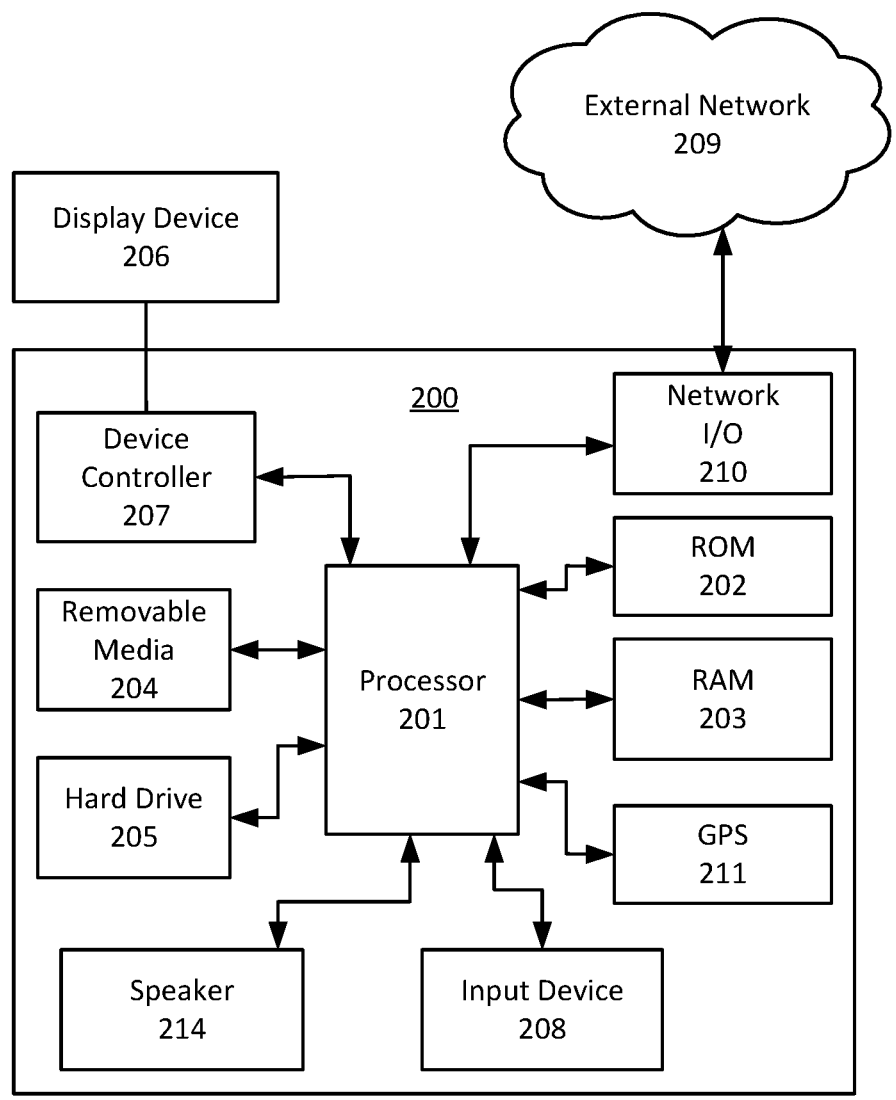
FIG. 2 shows hardware elements of an exemplary computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices or systems discussed herein (e.g., a capacity adjustment system 300, a client device 305, a global server load balancer (GSLB) 310, load balancers 315, 320, and/or 340, application servers 325, 330, and/or 345, and/or a distributed memory system 335). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
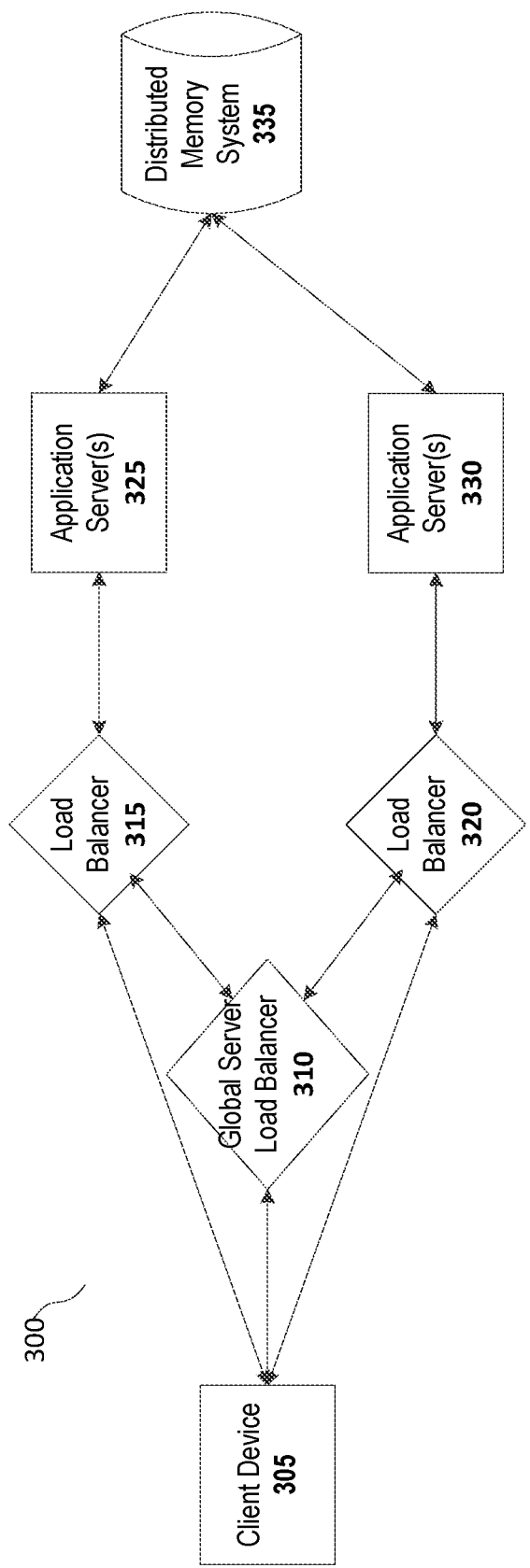
FIGS. 3a-3b show an example capacity adjustment system.
Figure 3B:
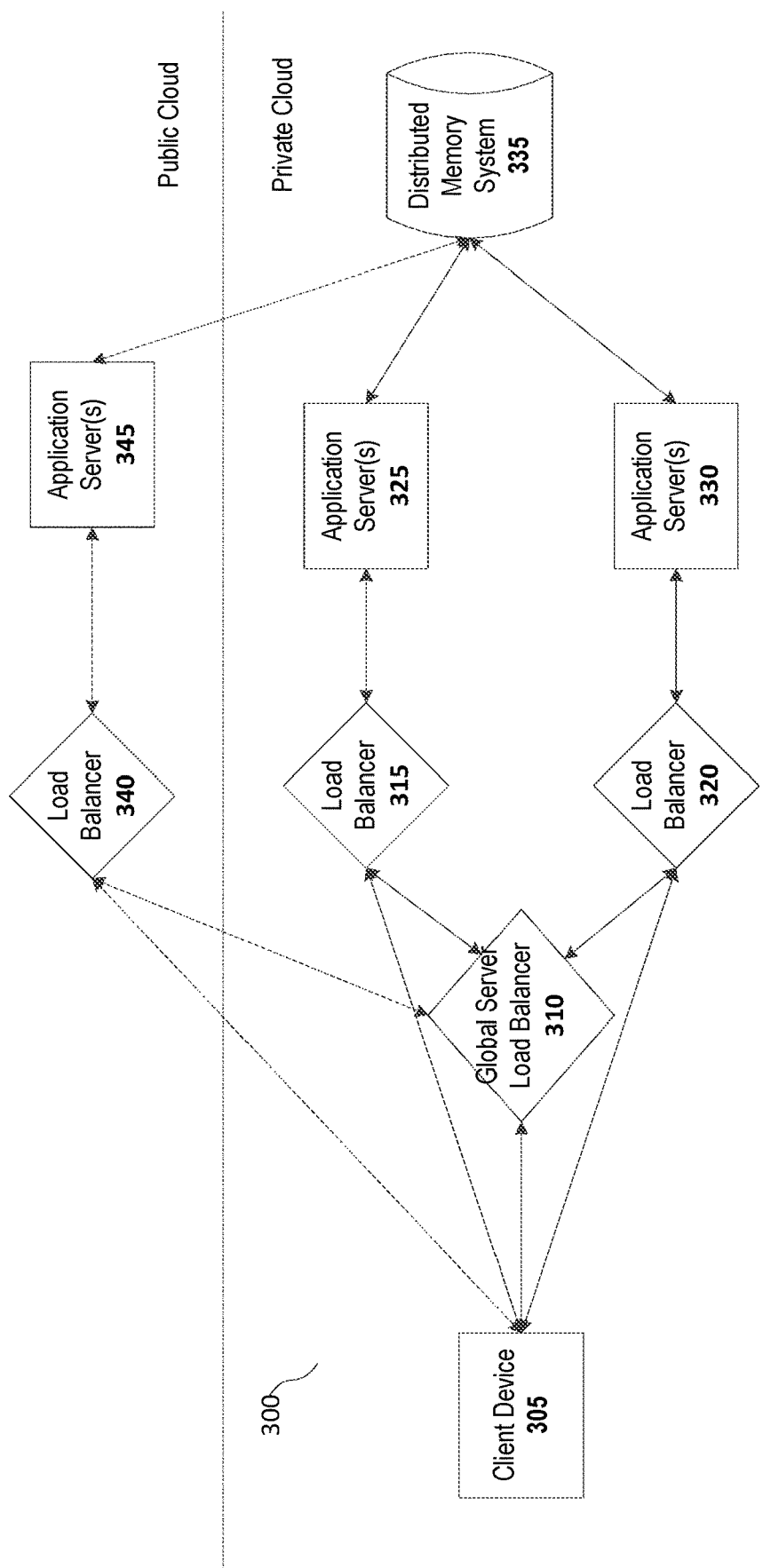

FIG. 3a shows an example capacity adjustment system 300. FIG. 3b shows the example capacity adjustment system 300 after expansion, as discussed below. Any component within the capacity adjustment system 300 may comprise, and/or may be a part of, any component from FIG. 1 or FIG. 2. The capacity adjustment system 300 may comprise one or more computing devices. For example, the capacity adjustment system 300 may comprise one or more client devices such as the client device 305, the GSLB 310, the load balancers 315, 320, and/or 340, and/or the application server(s) 325, 330, and/or 345. The capacity adjustment system 300 may also comprise a distributed memory system 335.

The client device 305 may be a smartphone, personal digital assistant, voice recognition assistant, laptop computer, tablet computer, desktop computer, smart home device, listening device, infotainment head unit of a vehicle, and/or other computing device configured to perform one or more functions described herein. The client device 305 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). Although only the client device 305 is shown in FIGS. 3a-3b, any number of client devices may be used in the capacity adjustment system 300 and may operate similar to the client device 305. The client device 305 may communicate with the GSLB 310, the load balancers 315, 320, and/or 340, and/or the application servers 325, 330, and/or 345.

The GSLB 310 may be a server or other computing device and may assign client devices to the different load balancers 315, 320, 340 it is associated with. The GSLB 310 may respond to DNS queries from the client device 305 and may provide the client device 305 with Internet Protocol (IP) addresses of the load balancers 315, 320, and 340. The GSLB 310 may receive a heartbeat signal from load balancers to determine whether the load balancers are working properly. The heartbeat signal may be contained in a packet generated by a load balancer. The heartbeat signal may indicate that the load balancer is active and/or ready to receive data from client devices. The heartbeat signal may occur at a regularly at a predefined interval (e.g., 5 milliseconds, 30 milliseconds, 50 milliseconds, 100 milliseconds, etc.). If the GSLB 310 does not receive a heartbeat signal from a load balancer within the interval the GSLB 310 may avoid assigning client devices to that load balancer. If the load balancer subsequently begins sending heartbeat signal to the GSLB 310, the GSLB 310 may begin assigning client devices to the load balancer. Although only the GSLB 310 is shown in FIGS. 3a-3b, any number of GSLBs may be used in capacity adjustment system 300 and may operate similar to the GSLB 310.

A load balancer, e.g., any or all of the load balancers 315, 320, and/or 340, may be a server or other computing device configured to perform one or more functions described herein. The load balancers 315, 320, and 340 may be associated with one or more application servers and may forward data that is sent from the one or more application servers to an intended destination. Data that is intended to reach the one or more application servers may be received by one or more of the load balancers 315, 320, and 340 and forwarded by the receiving load balancer to the intended application server. For example, the load balancer 315 may send and receive traffic that is coming from and going to the application server(s) 325. Although only the load balancers 315, 320, or 340 are shown in FIGS. 3a-3b, any number of load balancers may be used in the capacity adjustment system 300. Additional load balancers may operate similar to the load balancers 315, 320, and/or 340. Load balancers may correspond to geographic regions (e.g., North, West, East, etc.). A load balancer in a particular region may forward network traffic between application servers and client devices within that region and/or outside of that region.

Alternatively/additionally, a GSLB (e.g., the GSLB 310) may forward traffic between application servers and client devices. For example, the load balancer 315 may forward traffic from the application server 325 to the GSLB 310 and the GSLB 310 may forward the traffic from the application server 325 to the client device 305. A region within the capacity adjustment system 300 may comprise a load balancer and its associated application servers. For example, an East region may comprise the load balancer 315 and the application server 325.

The load balancers 315 and 320 may receive heartbeat signals from application servers they are associated with (e.g., the application server(s) 325, 330). If an application server fails to send a heartbeat signal to a load balancer, the load balancer may send one or more negative-acknowledgement (NAK) packets to any client device (e.g., the client device 305) that is communicating with the application server. The one or more NAK packets may indicate to the client device 305 that it needs to establish a connection with a different server. The client device 305 may avoid a delay (e.g., a communication timeout period of 5 seconds, 30 seconds, 1 minute, 5 minutes, etc.) waiting for a timeout because it is notified by the load balancer that the application server will not respond.

For example, the client device 305 may be communicating with the application server 325 and traffic between the client device 305 and the application server 325 may pass through the load balancer 315. During the communication process, the application server 325 may experience an error and may fail to send a heartbeat signal to the load balancer 315. Based on failing to receive a heartbeat signal within a predetermined time period, the load balancer 315 may send one or more NAK packets to the client device 305. Based on receiving the NAK packet(s), client device may send data to the load balancer 315 to establish a connection with a different application server that is associated with the load balancer 315. If the application server(s) 325 is a cluster of application servers, the client device 305 may establish a connection with an application server (different from the one that experienced an error) within the cluster of the application servers 325. The NAK packet(s) may comprise the IP address of a different application server with which the client device 305 may connect.

If the client device 305 is unable to communicate with the load balancer 315 (e.g., because of load balancer error, because a connection between the user device 305 and the load balancer 315 is interrupted, etc.), the client device 305 may wait a number of milliseconds (5, 50, 100, 500 etc.) before communicating with the GSLB 310 to obtain the IP address of a different load balancer to communicate with.

An application server, e.g., any of the application servers 330, 325, and/or 345, may be a computing device configured to perform one or more functions described herein. The application server(s) 325, 330, and/or 345 may be separate application servers or a part(s) of cluster(s) of servers comprising any number of application servers. Although only the application server(s) 325, 330, and 345 are shown, there may be any number of application servers (or groups of application servers) within the capacity adjustment system 300. Additional application servers may operate similar to the application servers 325, 330, and/or 345. The application server(s) 325 may be associated with the load balancer 315 and application server(s) 330 may be associated with the load balancer 320. Alternatively, the application server(s) 325 and 330 may be associated with one load balancer (e.g., the load balancer 315). Data sent to and received from the application server(s) 325 and 330 may pass through their associated load balancers 315 and 320. Application server(s) 325 and 330 may send heartbeat signals to their associated load balancers at predefined intervals as discussed above.

Distributed memory system 335 may be configured to back up data stored on the application server(s) 325 and 330. The distributed memory system 335 may be used to synchronize data between different application servers.

As shown in FIG. 3b, the capacity adjustment system 300 may expand to comprise more computing devices or computing systems. The capacity adjustment system 300 may expand when network traffic increases above a threshold. When expanding, the capacity adjustment system 300 may comprise an additional load balancer 340 with additional application server(s) 345. The load balancer 340 may have any component and/or functionality described above in reference to the load balancers 315 and 320. The application server 345 may have any component and/or functionality described above in reference to the application server 325 and 330. Although only one additional load balancer 340 and one additional application server(s) 345 are shown in FIG. 3b, the capacity adjustment system 300 may increase to comprise any number of load balancers and/or application servers.

The client device 305, the GSLB 310, the load balancers 315 and 320, the application server(s) 325 and 330, and the distributed memory system 335 may be part of a private cloud infrastructure (e.g., they may be owned and/or operated by a company or other type of entity). The load balancer 340 and the application server(s) 345 may be part of a public cloud infrastructure (e.g., they may be rented to a company that owns a private cloud infrastructure for temporary use).

The capacity adjustment system 300 may contract by removing computing devices or computing systems. When removing computing devices or systems, the capacity adjustment system 300 may remove an entire region (e.g., a load balancer and its associated application servers). For example, when removing a region, the GSLB 310 may remove the load balancer 340 by ceasing to assign client devices to the load balancer 340. The load balancer 340 and/or the application server 345 may send NAK packets to any client devices that are still connected to the application server 345. The NAK packets may terminate the connection between the client devices and the application server 345, and the load balancer 340 and application server 345 may be shut down or re-allocated.

Figure 4A:
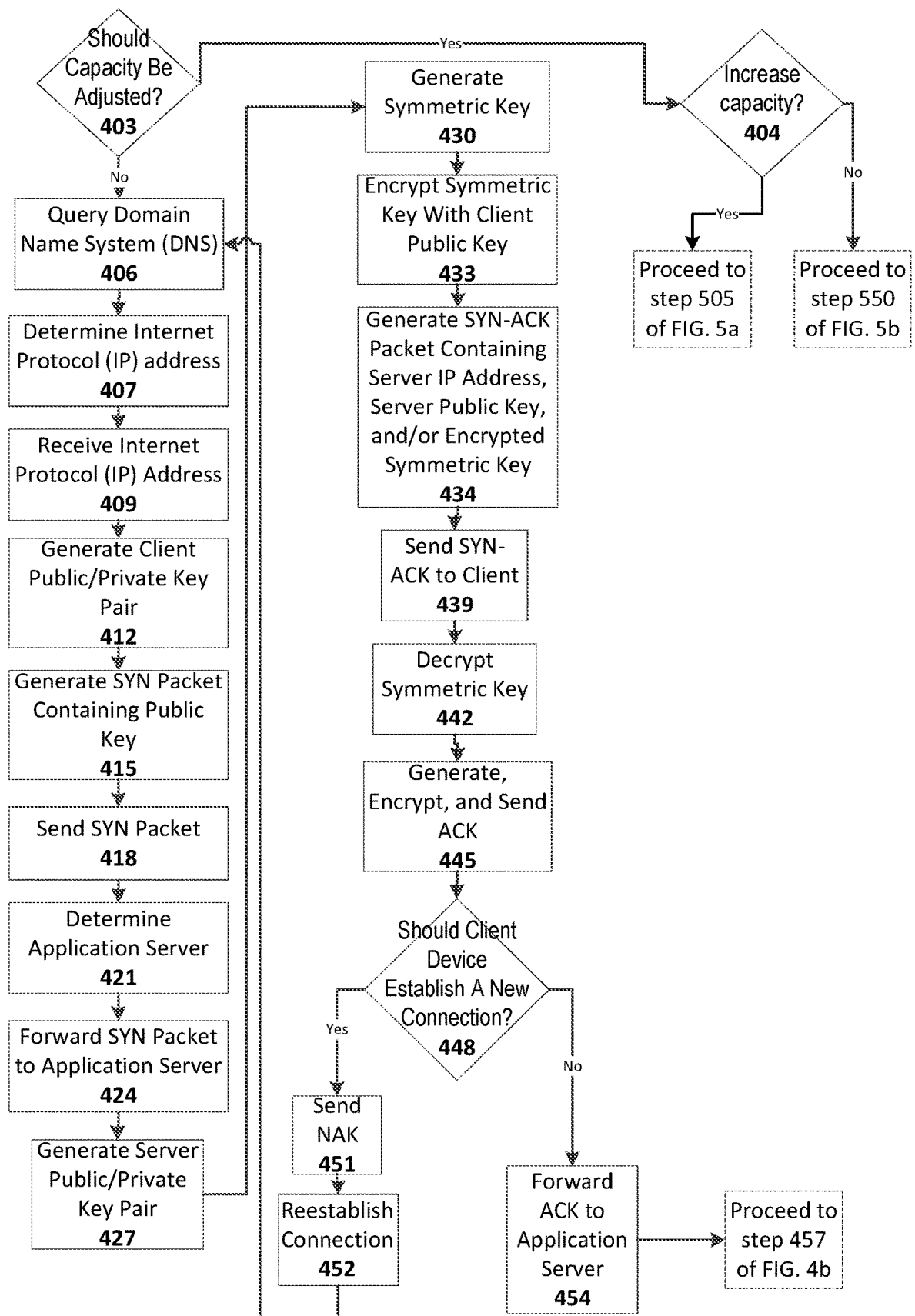
FIGS. 4a-4b show an example method for adjusting capacity in a networking environment.
Figure 4B:
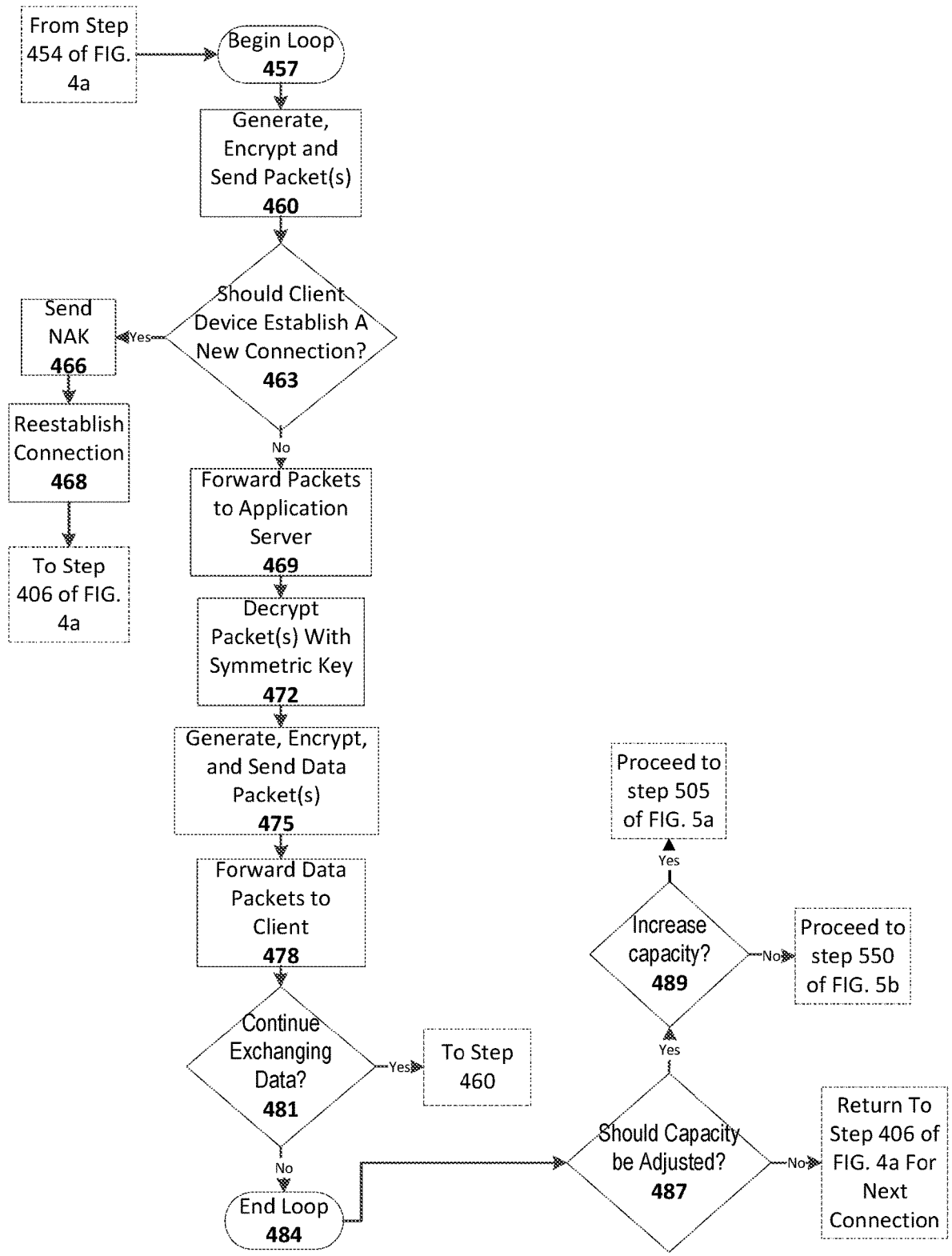

FIGS. 4a-4b show an example method for adjusting capacity within a networking environment. Steps in the method of FIGS. 4a-4b may be performed by elements of the capacity adjustment system 300, and/or by other computing devices. Steps of the method of FIGS. 4a-4b may be omitted, modified, rearranged (e.g., performed out of the order shown in FIGS. 4a-4b) and/or repeated, and/or other steps may be added.

At step 403, whether capacity should be adjusted may be determined. At step 404, if it is determined that capacity should be increased, step 505 of FIG. 5a may be performed. If it is determined that capacity should be decreased, step 550 of FIG. 5b may be performed. If it is determined that capacity should not be adjusted, step 406 may be performed. The determination of whether capacity should be adjusted may be based on network traffic within the capacity adjustment system 300. Network traffic may comprise any type of computer network traffic. Traffic may be determined using active (e.g., Iperf) or passive methods. Traffic may be determined using one or more packet sniffers. Traffic may be determined based on measured throughput in a network. Traffic may be determined by determining a load on a server such as the application servers 325, 330, and/or 345. If network traffic increases above a threshold, capacity may be increased. If network traffic decreases below a threshold, capacity may be decreased. The threshold may be based on a rate of increase in traffic. For example, if traffic rates are increasing linearly over time, capacity may remain unchanged. If traffic rates increase at a rate that is greater than linear (e.g., quadratic, exponentially, etc. with respect to time), capacity may be increased. The threshold for increasing and decreasing capacity may be based on the type of application or application server that is being used.

A determination of whether capacity should be adjusted may also or alternatively be based on a time of day, a time of year (e.g., holidays), a time of week, etc. Capacity may be adjusted up for times when network traffic is expected to increase. For example, capacity may be adjusted up on weekdays in the evenings during prime time television hours. Capacity may be adjusted down when network traffic is expected to decrease. For example, capacity may be adjusted down during early hours of the morning (e.g., 2 am, 4 am, etc.). Capacity adjustment may be manually set in advance of particular events (e.g., additional load balancers and/or additional application servers may be set to run during a sporting event).

At step 406, a domain name system (DNS) may be queried. For example, the client device 305 may send a query to GSLB 310 to obtain an IP address. The DNS may be queried for the purpose of establishing a connection between the client device 305 and one of the application servers 325, 330, and/or 345.

At step 407, an IP address may be determined for the DNS query from step 403. The IP address may correspond to a load balancer. For example, the GSLB 310 may process the DNS query to determine one of the load balancers 315, 320, or 340 through which the client device 305 may establish a connection. The load balancer may be determined based on a round robin method where each client device that is trying to establish a connection with an application server may assigned to a load balancer in an order that rotates among the load balancers. Also or alternatively, a load balancer may be determined based on which load balancer is the least loaded. For example, the GSLB 310 may determine the number of client devices that are connected with each of the load balancers 315, 320, 340 and determine which load balancer has the lowest number of connections. The GSLB 310 may receive a heartbeat signal from each load balancer it is associated with. The heartbeat signal may indicate that the load balancer is working properly. If no heartbeat data has been received from, for example, the load balancer 315 in some threshold time, the GSLB 310 may cease routing traffic to the load balancer 315.

At step 409, the IP address of the load balancer (e.g., the load balancer 315) may be received. For example, the client device 305 may receive, from the GSLB 310, the IP address of the load balancer 315 as determined in step 407. At step 412, a client public key and client private key may be generated. For example the client device 305 may generate the client public key and the client private key. Any public/private key generating algorithm may be used (e.g., RSA) to generate the client public key and client private key.

At step 415, one or more synchronize (SYN) packets comprising the client public key may be generated. The SYN packet(s) may be generated by the client device 305. The SYN packet(s) may be used for indicating that a new connection is to be established between a client device and an application server. The SYN packet(s) may comprise the client public key generated in step 409. At step 418, the SYN packet(s) may be sent. For example, the client device 305 may send the SYN packet(s) to the load balancer 315 determined in step 407.

At step 421, an application server may be determined. The application server may be determined in response to receiving the SYN packet(s) generated in step 415. For example, the load balancer 315 may receive the SYN packet(s) and may determine an application server (e.g., from among the application servers 325 if the application server 325 is a cluster of application servers) to route the SYN packet(s) to. The application server may be determined based on a round robin method where each client device that is trying to establish a connection is assigned to an application server in an order that rotates among the application servers 325. Also or alternatively, a load balancer may be determined based on which load balancer is the least loaded. For example, the GSLB 310 may determine the number of client devices that are connected with each of the application servers 325, 330, 345 and determine which application server has the lowest number of connections. The load balancer that is associated with the application server with the lowest number of connections may be chosen.

At step 424, the SYN packet(s) may be forwarded to the application server determined in step 421 (e.g., the application server 325). For example, the load balancer 315 may send the SYN packet(s) to the application server 325. The application server 325 may store the client public key that may be sent with the SYN packet(s). At step 427, a server public key and a server private key may be generated, for example, by the application server 325. Any public/private key generating algorithm may be used (e.g., RSA) to generate the server public key and the server private key.

At step 430 a symmetric key may be generated. For example, the application server 325 may generate the symmetric key. Any symmetric key generating algorithm may be used to generate the symmetric key (e.g., Advanced Encryption Standard, Twofish, Blowfish, etc.). At step 433, the symmetric key may be encrypted using the client public key. For example, the application server 325 may encrypt the symmetric key using the client public key. At step 434, one or more synchronize-acknowledge (SYN-ACK) packets may be generated by the application server 325. The SYN-ACK packet(s) may be used to establish a connection with the client device 305. The SYN-ACK packet(s) may comprise the IP address of the application server 325, the server public key, and/or the encrypted symmetric key.

At step 439, the SYN-ACK packet(s) may be sent to the client. For example, the application server 325 may send the SYN-ACK packet(s) to the client device 305. The SYN-ACK packet(s) may be sent to the client via the load balancer 315. For example, the application server 325 may send the SYN-ACK packet(s) to the load balancer 315, and the load balancer 315 may forward the SYN-ACK packet(s) to the client device 305.

At step 442, the symmetric key may be decrypted. For example, the client device 305 may receive the SYN-ACK packet(s) and may decrypt the encrypted symmetric key received in the SYN-ACK packet(s). The client device 305 may use the client private key to decrypt the encrypted symmetric key. At step 445, one or more acknowledgement (ACK) packets may be generated, encrypted, and sent. For example, the client device 305 may generate one or more ACK packets and encrypt those packet(s) using the symmetric key. The client device 305 may send the encrypted ACK packet(s) to the application server 325. The encrypted ACK packet(s) may be sent via the load balancer 315.

At step 448, whether the client device should establish a new connection (e.g., to a different application server) may be determined. Step 448 may be performed at any time, and/or throughout method 400. For example, after any or all steps of the method, an additional decision block may be added to proceed to step 448 if an application server is not able to respond to a client device and/or under other conditions. The client device 305 may establish a new connection with an application server if the application server that the client device 305 is currently connected to is not working properly. For example, the client device 305 may be connected to the application server 325 and the load balancer 315 may determine whether the application server 325 is working properly. Whether the application server 325 is working properly may be determined based on heartbeat data that the application server 325 sends to the load balancer 315. The load balancer 315 may check for new heart beat data at a predefined interval (e.g., every 30 milliseconds, 50 milliseconds, 80 milliseconds, 100 milliseconds, etc.). If the load balancer 315 does not receive heartbeat data, the load balancer 315 may determine that the application server 325 is not working properly. It may be determined that the client device 305 should establish a new connection if the application server that the client device 305 is communicating with shuts down, receives an update, or otherwise is unable to communicate with the client device 305.

If it is not determined that the client device should establish a new connection, step 454 may be performed (described below). If it is determined that the client device should establish a new connection, step 451 may be performed, and one or more NAK packet(s) may be sent. For example, the load balancer 315 may determine that the application server 325 is not working properly, and may send one or more NAK packet(s) to the client device 305. The NAK packet(s) may indicate to the client device that the client device should create a new connection with another application server. The NAK packet(s) may indicate that an application server with which a client device has established a connection is no longer able to exchange data with the client device. For example, the NAK packet(s) may indicate that the application server 325 is being updated, is shutting down due to low demand (e.g., a low number of connected client devices), or that it has experienced an error. The NAK packet(s) may indicate a device with which the client device 305 may establish a connection. For example, the NAK packet(s) may include an IP address of a load balancer and/or application server. Based on receiving one or more NAK packets, step 452 may be performed and a connection may be reestablished. For example, the client device 305 may take steps to reestablish a connection with an application server (e.g., a different application server within the application server(s) 325, the application server(s) 330, or the application server(s) 345). To reestablish a connection between the client device 305 and an application server, any of steps 406-445 may be performed.

Also or alternatively, the application server 325 may send one or more NAK packets to the client device 305. The application server 325 may generate and/or send one or more NAK packets if the application server 325 receives information or a signal to shut down, restart, update, terminate connections, or any other information that indicates that a connection with the client device 305 should be terminated.

At step 454, the encrypted ACK packet(s) may be forwarded to an application server. For example, the load balancer 315 may forward the encrypted ACK packet(s) to the application server 325.

As shown in FIG. 4b, at step 457, a loop to exchange data may begin. For example, the loop may comprise steps 460 through 484 and may involve the client device 305 exchanging data with the application server 325. At step 460, the client device 305 may generate, encrypt, and send one or more data packets to the application server 325. The data packet(s) may be encrypted using the symmetric key that was decrypted by the client device 305 in step 442. The data packet(s) may be sent to the load balancer 315 before they are sent to the application server 325.

At step 463, which may be performed after, before, or simultaneously with receipt of the data packet(s) by the load balancer 315, it may be determined whether the client device 305 should establish a new connection with an application server. The load balancer 315 or the application server 325 may determine whether the client device 305 should establish a new connection in the same way that is described in step 448. If it is determined that the client device 305 should establish a new connection, one or more NAK packets may be sent to the client device 305 in step 466. The NAK packet(s) may indicate that the client device 305 should end its connection with the application server 325 and/or establish a new connection with an application server. At step 468, a connection may be reestablished. For example, the client device 305 may go to step 406 of FIG. 4a to reestablish a connection with an application server. To reestablish a connection between the client device 305 and an application server, any of steps 406-445 may be performed.

If it is not determined in step 463 that the client device should establish a new connection, step 469 may be performed. At step 469, the load balancer 315 may forward the data packet(s) to the application server 325. At step 472, the application server 325 may decrypt the data packets with the symmetric key. At step 475, the application server 325 may generate, encrypt, and send data packet(s) to the client device 305. The data packet(s) that are sent to the client device may be responsive to the data packet(s) that the application server 325 received from the client device 305. The data packet(s) may be sent to the client device 305 via the load balancer 315. At step 478, load balancer may forward the data packet(s) to the client device 305.

At step 481, the application server and client device may determine whether to continue exchanging data. If the application server and client device have additional data to exchange, any of steps 460-481 may be repeated. If the application server and client device do not have additional data to exchange, the loop to exchange data may end at step 484.

At step 487, whether capacity should be adjusted may be determined. At step 489, if it is determined that capacity should be increased, step 505 of FIG. 5a may be performed. If it is determined that capacity should be decreased, step 550 of FIG. 5b may be performed. If it is determined in step 487 that capacity should not be adjusted, step 406 of FIG. 4a may be performed and additional client devices may make connections with additional application servers (e.g., the application servers 325, 330, and/or 345). Whether capacity should be adjusted may be determined as explained in step 403 of FIG. 4a. The determination of whether capacity should be adjusted may be based on network traffic within the capacity adjustment system 300. Traffic may comprise any type of computer network traffic. Traffic may be determined using active (e.g., Iperf) or passive methods. Traffic may be determined using one or more packet sniffers. Traffic may be determined based on measured throughput in a network. Traffic may be determined by measuring a load on a server (e.g., number of client devices connected to the server, amount of data being exchanged between server and client devices, etc.) such as any of the application servers 325, 330, or 345.

Figure 5A:
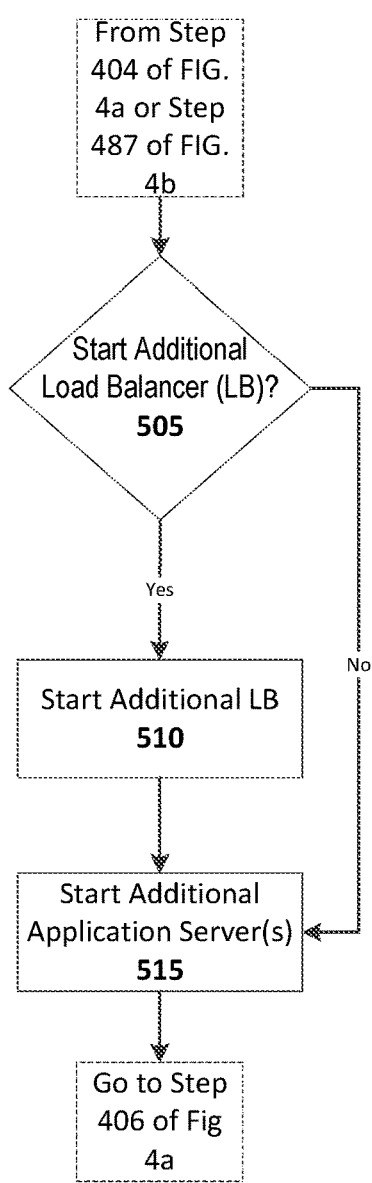
FIGS. 5a-5b show steps for increasing or decreasing capacity of a network as part of the example method for adjusting capacity within a networking environment described in FIGS. 4a and 4b.
Figure 5B:
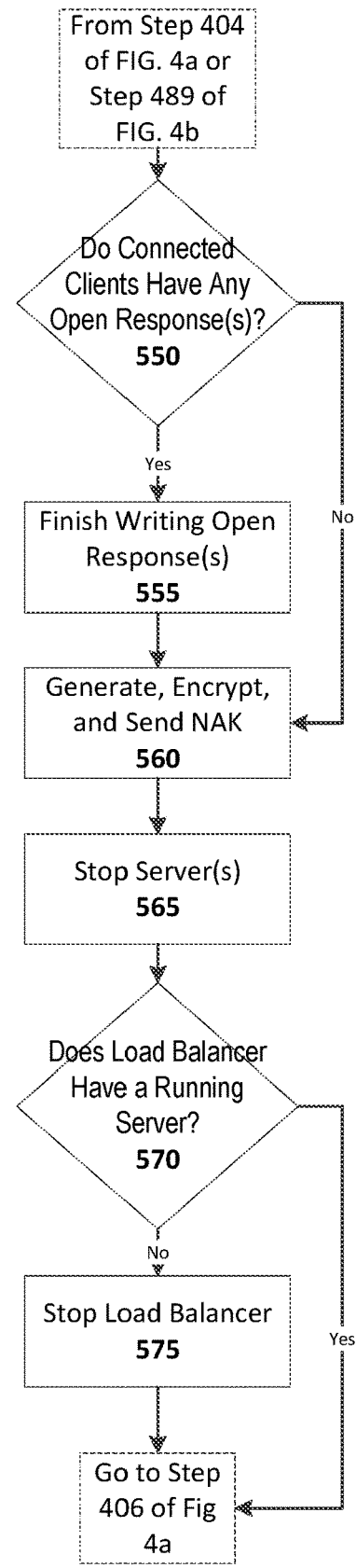
Figure 6A:
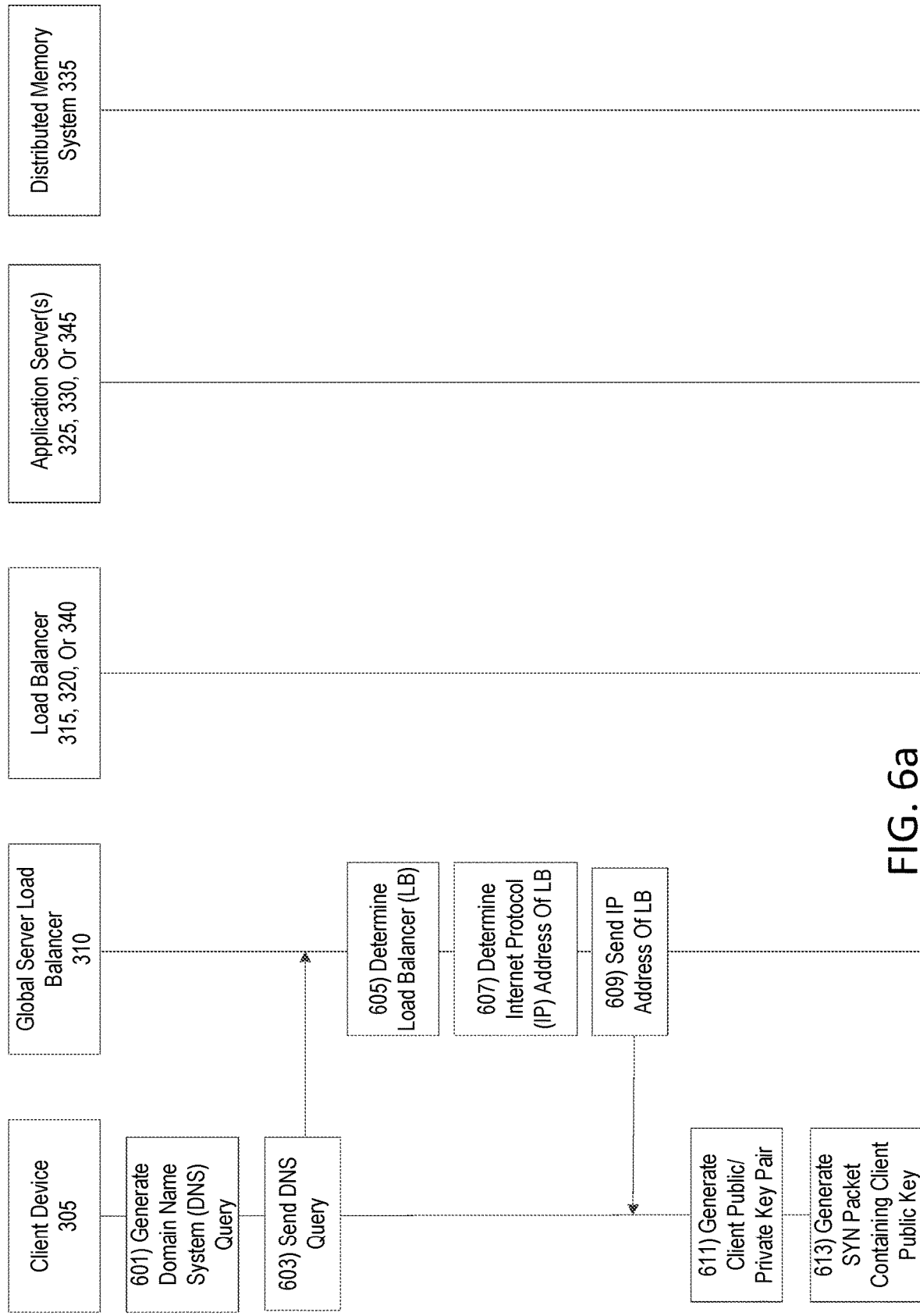
FIGS. 6a-6e show an additional example method for adjusting capacity in a networking environment.
Figure 6B:
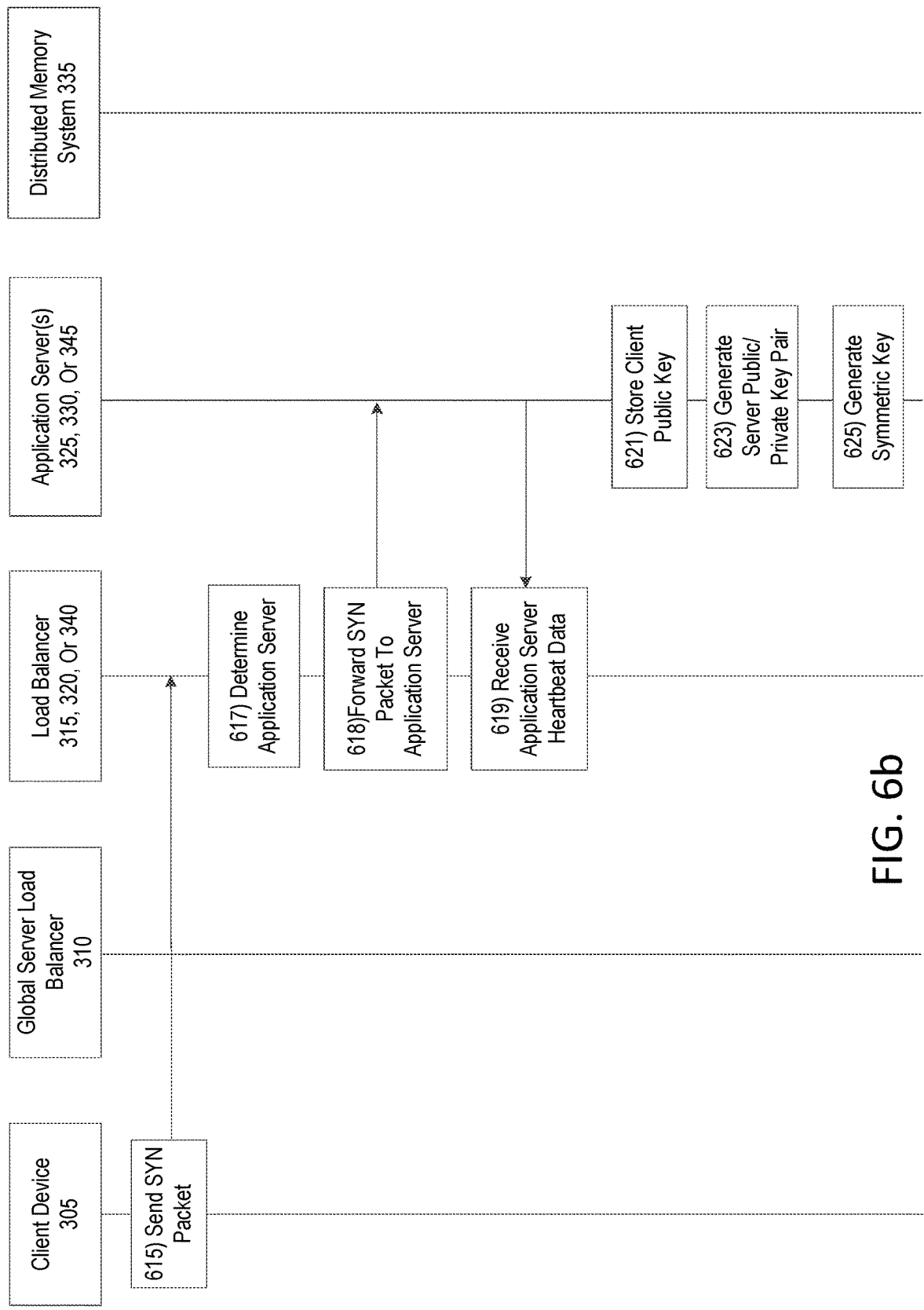
Figure 6C:
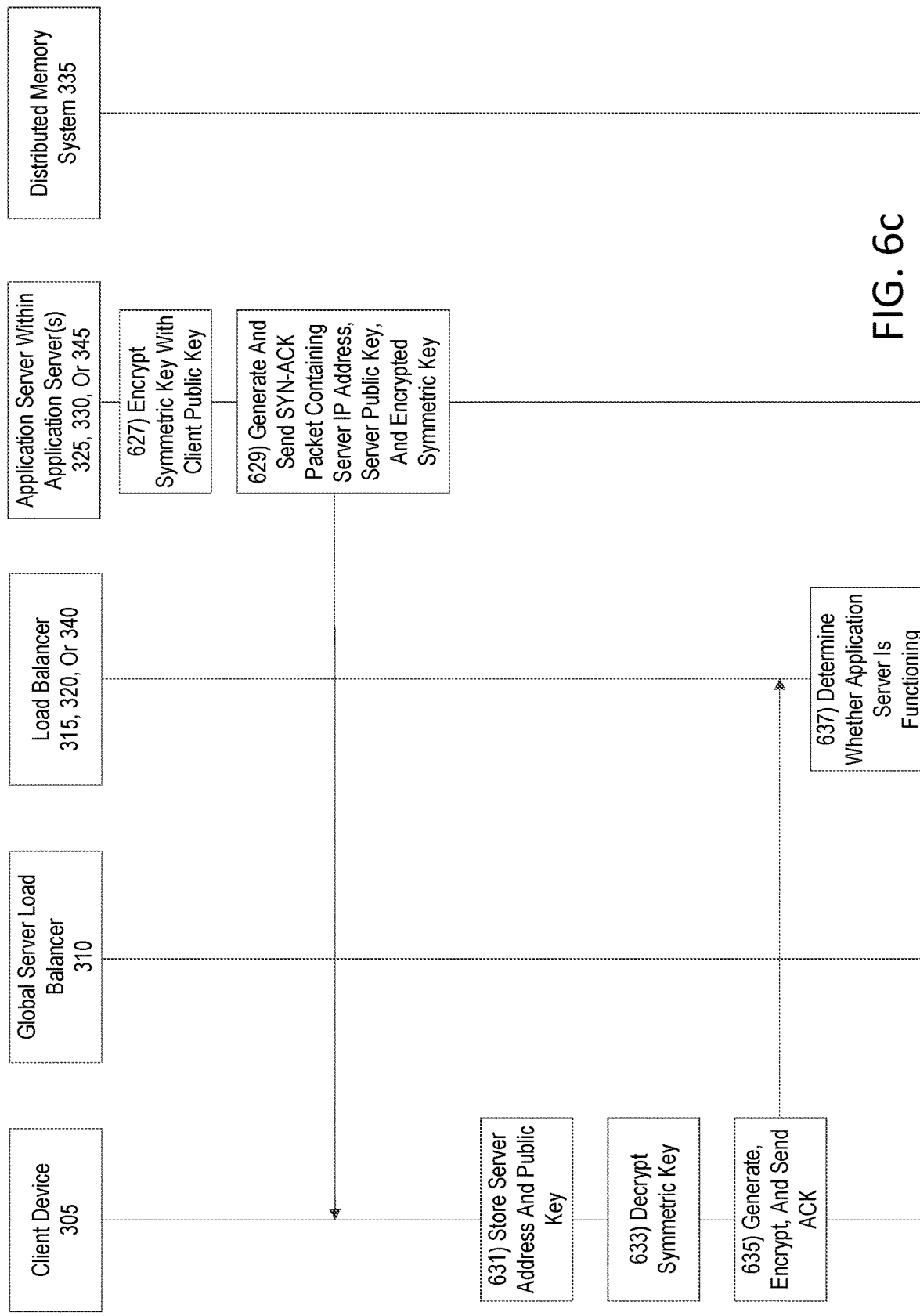
Figure 6D:
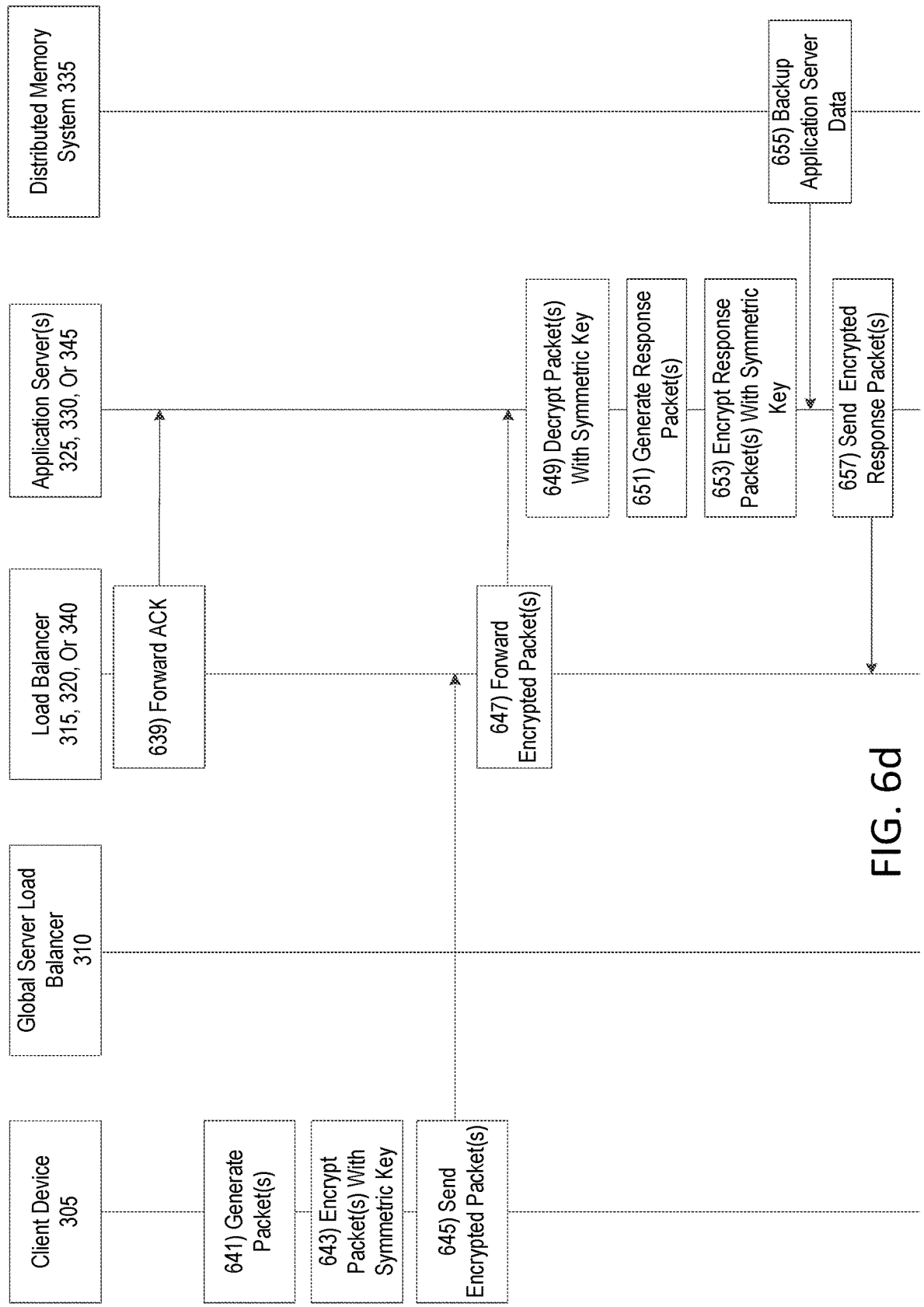
Figure 6E:
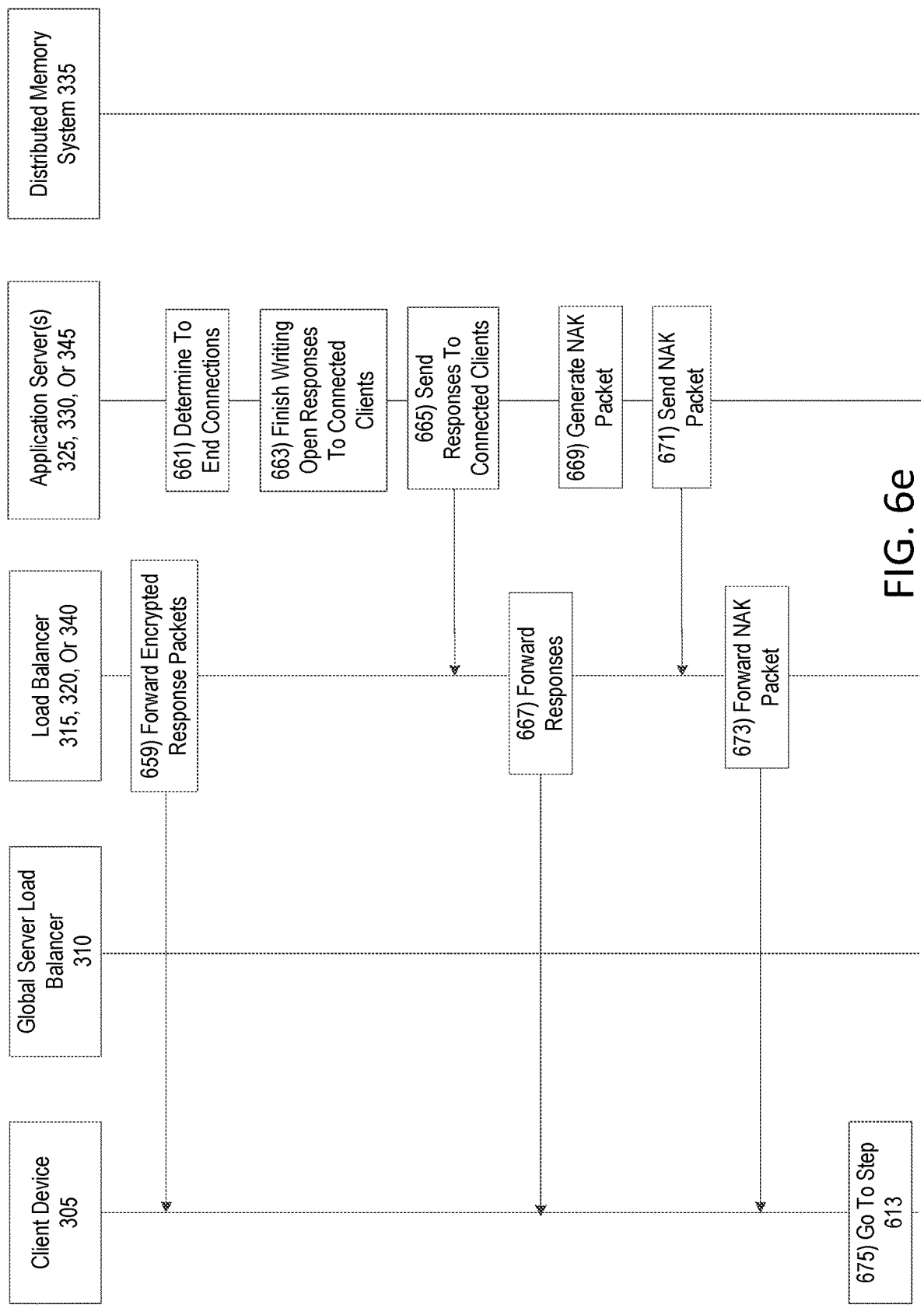

FIGS. 5a-5b show steps for increasing or decreasing capacity of a network as part of the example method for adjusting capacity within a networking environment described in FIGS. 4a-4b. Steps in FIG. 5a may be used to expand network capacity in response to increasing demand from one or more client devices. Steps in FIG. 5b may be used to reduce network capacity in response to decreasing demand from one or more client devices. The steps of FIGS. 5a and 5b may be performed by one or more elements of the capacity adjustment system 300, and/or other computing devices. Steps of FIGS. 5a and 5b may be omitted, modified, rearranged (e.g., performed out of the order shown in FIGS. 5a and 5b) and/or repeated, and/or other steps may be added.

Step 505 (FIG. 5a) may be performed if it is determined capacity should be increased at step 404 (FIG. 4a) or step 489 (FIG. 4b). At step 505, whether to start an additional load balancer may be determined. Whether to start an additional load balancer may be determined based on the traffic determined in step 403 (e.g., throughput, etc.). Whether to start an additional load balancer may be determined based on a traffic threshold being met. For example, if the average time it takes for a group of application servers to respond to client devices satisfies a threshold, an additional load balancer may be started. Whether to start an additional load balancer may be determined based on the load of traffic on a cluster of servers such as the application server(s) 325 and 330. For example, one server within a cluster of servers may handle 100 requests per second. There may be three actively running servers in the cluster, with 20 total servers available in the cluster. As the request load nears 300 requests per second, an additional server may be activated to bring the number of active servers to four total. As the request load to the cluster approaches 2000 requests per second, an additional load balancer with capacity for a number of servers (20, 50, 100, etc.) may be started.

If it is determined to start an additional load balancer, at step 510 an additional load balancer 340 may be started. The load balancer 340 may be associated with the GSLB 310 so that the GSLB 310 can notify client devices to connect to the load balancer 340. For example, after the load balancer 340 is started, the GSLB 310 may add the load balancer 340 to a list of load balancers that are available to communicate with client devices. The GSLB 310 may send new client devices the address of the load balancer 340 so that the new client devices can establish a connection with application servers associated with the load balancer 340.

At step 515, additional application servers 345 may be started. The application servers 345 may be associated with the load balancer 340. For example, data sent between client devices and the application servers 345 may pass through the load balancer 340. After additional application servers are started, step 406 (FIG. 4*a*) may be performed.

Step 550 (FIG. 5*b*) may be performed if it is determined that capacity should not be increased (e.g., capacity should be reduced) in step 404 (FIG. 4*a*) or step 489 (FIG. 4*b*). At step 550, whether any connected clients have open responses may be determined. For example, the application server 345 may be in the middle of writing response packets to client devices (e.g., the client device 305). If it is determined that open responses exist, the application server 345 may at step 555 finish writing open responses to client devices.

At step 560, one or more NAK packets may be generated, encrypted, and sent to connected client devices such as the client device 305. As described above, the NAK packet(s) may indicate to a client device that the connection between an application server and client device is closed. The NAK packet(s) may indicate that the client device should query the GSLB 310 to determine an IP address of a load balancer and an application server (e.g., go back to step 406).

Alternatively, the NAK packet(s) may indicate that the client device should obtain an IP address of a different server that is associated with the same load balancer. For example, the client device 305 may establish a connection with the application server 345 and data exchanged between the client device 305 and the application server 345 may be routed through the load balancer 340. If the client device 305 receives one or more NAK packet(s) (either from the application server 345 or the load balancer 340), steps (e.g., steps 415-445) may be repeated to establish a connection between the client device 305 and a different application server that is associated with the load balancer 340 (e.g., if the application server 345 is a cluster of application servers, the client device 305 may establish a connection with an application server within the cluster of application servers). Also or alternatively, steps (e.g., steps 406-445) may be repeated to establish a connection between the client device 305 and a different application server that is associated with other load balancers such as one of the load balancers 315 or 320.

At step 565, one or more application servers may be stopped. The one or more application servers may be associated with the same load balancer (e.g., the load balancer 345). The one or more application servers may be shut down or otherwise forced to stop responding to communications from client devices. At step 570, whether the load balancer (associated with the servers stopped in step 565) has a running server may be determined. A running server may be an application server (e.g., the application server 345) that is continuing to exchange data with one or more client devices (e.g., the client device 305). If the load balancer is not associated with an application server that is running, the load balancer may be stopped (e.g., shut down) in step 575. If the load balancer is associated with an application server that is still running, the method may be continued from step 406 of FIG. 4*a*.

FIGS. 6*a*-6*e* show an additional example method for adjusting capacity within a networking environment. Although FIGS. 6*a*-6*e* show operations being performed by elements of the capacity adjustment system 300, some or all of the operations shown in FIGS. 6*a*-6*e* could also or alternatively be performed by different elements of the capacity adjustment system 300 and/or by other computing devices.

At step 601 (FIG. 6*a*), the client device 305 may generate one or more DNS queries. For example, all or a portion of step 406 of FIG. 4*a* may be performed as part of step 601. At step 603, the client device 305 may send the DNS query to the GSLB 310. For example all or a portion of step 406 of FIG. 4*a* may be performed as part of step 603. At step 605, the GSLB 310 may determine a load balancer for the DNS query. For example, all or a portion of step 407 of FIG. 4*a* may be performed as part of step 605. At step 607, the GSLB 310 may determine an IP address of one of the load balancers 315, 320, or 340. For example, all or a portion of step 407 of FIG. 4*a* may be performed as part of step 607. For purposes of example in FIGS. 6*a* through 6*e*, it is assumed that the load balancer 315 is chosen, but one or more other load balancers could also or alternatively be chosen. At step 609, the GSLB 310 may send the IP address of the load balancer 315 to the client device 305 (and/or to another client device). For example, all or a portion of step 409 of FIG. 4*a* may be performed as part of step 609. At step 611, the client device 305 may generate a client public/private key pair. For example, all or a portion of step 412 of FIG. 4*a* may be performed as part of step 611. At step 613, the client device 305 may generate one or more SYN packets comprising the client public key. For example, all or a portion of step 415 of FIG. 4*a* may be performed as part of step 613.

At step 615 (FIG. 6*b*), the client device 305 may send the SYN packet(s) to one or more of the load balancers 315, 320, or 340. For example, all or a portion of step 418 of FIG. 4*a* may be performed as part of step 615. At step 617, the load balancer 315 may determine one of application servers 325, 330, or 345, or another application server, for the client device 305. For example, all or a portion of step 421 of FIG. 4*a* may be performed as part of step 617. For purposes of example in FIGS. 6*a* through 6*e*, it is assumed that the application server 325 is determined, but one or more other application servers could also or alternatively be determined. At step 618, the load balancer 315 may forward the SYN packet(s) to the application server 325. For example, all or a portion of step 424 of FIG. 4*a* may be performed as part of step 618. At step 619, the load balancer may receive heartbeat data from the application server 325. For example, all or a portion of steps 448-454 of FIG. 4*a* may be performed as part of step 619. Step 619 is shown once for purposes of example, but may be performed multiple times and/or at regular intervals. For example, step 619 may be performed before or after any of the steps described in FIGS. 6*a*-6*e*. At step 621, the application server 325 may store the client public key. For example, all or a portion of step 424 of FIG. 4a may be performed as part of step 621. At step 623, the application server 325 may generate a server public key and a server private key. For example, all or a portion of step 427 of FIG. 4a may be performed as part of step 623. At step 625, the application server 325 may generate a symmetric key. For example, all or a portion of step 430 of FIG. 4a may be performed as part of step 625.

At step 627 (FIG. 6c), the application server 325 may encrypt the symmetric key using the client public key. For example, all or a portion of step 433 of FIG. 4a may be performed as part of step 627. At step 629, the application server 325 may generate and send one or more SYN-ACK packets comprising the IP address of the application server 325, the server public key, and the encrypted symmetric key. For example, all or a portion of step 434 of FIG. 4a may be performed as part of step 629. At step 631, the client device 305 may store the symmetric key and the IP address of the application server 325. For example, all or a portion of steps 434-439 of FIG. 4a may be performed as part of steps 629-631. At step 633, the client device 305 may decrypt the symmetric key using the client private key. At step 635, the client device 305 may generate, encrypt, and send one or more ACK packets to the load balancer 315. At step 637, the load balancer 315 may determine whether the application server 325 is functioning properly. For example, all or a portion of steps 442-448 of FIG. 4a may be performed as part of steps 633-637.

At step 639 (FIG. 6d), the load balancer 315 may forward the ACK packet(s) to the application server 325. At step 641, the client device 305 may generate one or more packets. At step 643, the client device 305 may encrypt the one or more packets using the symmetric key. At step 645, the client device 305 may send the encrypted one or more packets to the load balancer 315. At step 647, the load balancer 315 may forward the encrypted one or more packets to the application server 325. For example, all or a portion of steps 454-469 of FIG. 4a-4b may be performed as part of steps 639-647.

At step 649, the application server 325 may decrypt the encrypted one or more packets with the symmetric key. At step 651, the application server 325 may generate one or more response packets that are responsive to the packet(s) received from the client device 305. At step 653, the application server 325 may encrypt the response packet(s) with the symmetric key. At step 655, the distributed memory system 335 may backup application server data. Application server data may comprise the data stored on the application server 325. At step 657, the application server 325 may send the encrypted response packet(s) to the load balancer 315. For example, all or a portion of steps 472-475 of FIG. 4b may be performed as part of steps 649-657.

At step 659 (FIG. 6e), the load balancer 315 may forward the encrypted response packet(s) to the client device 305. For example, all or a portion of step 478 of FIG. 4b may be performed as part of step 659. At step 661, the application server 325 may determine to end connections with client devices. For example, all or a portion of step 481 of FIG. 4b may be performed as part of step 661. At step 663, the application server 325 may finish writing open responses to connected client devices. At step 665, the application server 325 may send the finished responses to the connected client devices. At step 667, the load balancer 315 may forward the finished responses to the corresponding client devices which may comprise the client device 305. For example, all or a portion of step 555 of FIG. 5b may be performed as part of steps 663-667.

At step 669, the application server 325 may generate one or more NAK packets. At step 671, the application server 325 may send the NAK packet(s) to the load balancer 315. At step 673, the load balancer 315 may forward the NAK packet(s) to the client device 305.

At step 675, the client device may repeat step 613 and proceed to establish connection with an application server. For example, all or a portion of steps 448-452 of FIG. 4a may be performed as part of steps 669-675.

Various types of messages (e.g., SYN, SYN-ACK, ACK, and NAK packets) have been described above. Other types of messages may be used instead of or in addition to any or all of the above-described messages. Those other types of messages may carry information similar and/or identical to information carried by any of the above-described messages, may carry information different from information carried by the above-described messages, may perform the same or similar function as any of the above-described messages, may perform functions different from functions performed by the above-described messages, and/or may have a format that is the same as or different from a format of any of the above-described messages.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   establishing, by a client device, an initial connection with a first server, wherein the establishing comprises:
      sending, by the client device to a load balancer, an initial message associated with a request to initiate a server connection, wherein the initial message comprises:
         data indicating the request, and
         a client public key, and
      receiving, by the client device from the first server, a second message comprising:
         an Internet Protocol (IP) address of the first server, and
         a server key to be used for encrypting communication between the client device and the first server;
   receiving a third message indicating that the first server will stop serving the client device; and
   based on the third message, establishing a connection with a second server.

2. The method of claim 1, further comprising:
   generating, by the client device, a client key pair comprising the client public key and a client private key; and
   decrypting, by the client device and using the client private key, the server key,
   wherein information exchanged between the client device and the first server is encrypted with the server key.

3. The method of claim 1, wherein the third message is received before a timeout occurs, wherein the client device is configured to close a connection with the first server when the timeout occurs, and wherein the third message comprises an address of the second server.

4. The method of claim 1, wherein the establishing the connection with the second server comprises:

receiving, by the client device and from a second load balancer, an IP address corresponding to the second load balancer; and sending, by the client device, an additional message to the second load balancer.

5. The method of claim 1, wherein the establishing the connection with the second server comprises:
sending, by the client device, an additional message to the load balancer.

6. The method of claim 1, wherein the third message is received from the load balancer.

7. The method of claim 1, wherein the third message is received from the first server, and the method further comprises:
based on the third message, closing a connection with the first server.

8. The method of claim 1, wherein the second message comprises information indicating that a connection has been established between the client device and the first server.

9. The method of claim 1, wherein the server key is encrypted based on the client public key.

10. The method of claim 1, wherein the data indicating the request and the client public key are in a data packet.

11. A method comprising:
sending, by a computing device to a first server, an initial message received from a client device and associated with a request to initiate an initial server connection, wherein the initial message comprises a client public key and data indicating the request;
sending, by the computing device to the client device, a second message comprising:
an Internet Protocol (IP) address of the first server, and
a server key to be used for encrypting communication between the client device and the first server;
based on determining that the first server is functioning, sending, by the computing device to the first server, one or more encrypted requests from the client device;
sending, by the computing device to the client device, one or more encrypted responses to the encrypted requests;
determining, by the computing device, that demand for connections with the first server has decreased; and
sending, by the computing device, to the client device, and based on the determining that the demand has decreased, a third message indicating that the first server will stop communicating with the client device.

12. The method of claim 11, wherein the determining that demand for connections has decreased comprises determining a quantity of devices that are connected with the first server.

13. The method of claim 11, further comprising:
maintaining, by the computing device, a list of servers unable to respond to client devices, wherein the sending the third message occurs after determining, by the computing device and based on the list of servers, that the first server is unable to respond to client devices.

14. The method of claim 11, wherein the determining that demand for connections has decreased comprises determining a quantity of data being sent by the first server.

15. The method of claim 11, wherein the computing device is a regional load balancer associated with one of multiple regions, and the first server is an application server connected to the regional load balancer.

16. The method of claim 11, wherein the third message comprises information indicating a second server for establishing a connection with the client device.

17. The method of claim 11, further comprising determining, by the computing device, that a heartbeat signal has not been received from the first server.

18. The method of claim 11, further comprising:
determining, by the computing device, that a traffic threshold corresponding to the first server has been satisfied; and
sending, by the computing device and based on the determining that the traffic threshold has been satisfied, a shutdown signal to the first server.

19. The method of claim 11, further comprising:
determining, by the computing device, that a traffic threshold corresponding to the first server has been satisfied; and
initiating, by the computing device and based on the determining that the traffic threshold has been satisfied, use of one or more additional servers.

20. A method comprising:
establishing an initial connection between a first server and a client device, wherein the establishing comprises:
receiving, by the first server and from a load balancer, an initial message associated with a request to initiate a server connection, wherein the initial message comprises:
data indicating the request, and
a client public key; and
sending, by the first server and to the client device, a second message comprising:
an Internet Protocol (IP) address of the first server, and
a server key to be used for encrypting communication between the client device and the first server;
receiving, by the first server and via the initial connection, client data from the client device;
sending, by the first server and via the initial connection, server data to the client device; and
sending, by the first server and to the client device, a third message indicating that the first server will close the initial connection with the client device, wherein the third message comprises information indicating a second server for establishing a connection with the client device.

21. The method of claim 20, further comprising:
receiving, by the first server, a signal that indicates to end the initial connection between the first server and the client device, wherein the sending the third message occurs after the receiving a signal.

22. The method of claim 20, further comprising:
encrypting, by the first server and based on the client public key, the second message and the server data prior to sending to the client device.

23. The method of claim 20, further comprising:
determining that demand for connections with the first server has decreased, wherein the sending the third message is based on the determining that the demand has decreased.

* * * * *

UNITED STATES PATENT AND TRADEMARK OFFICE
CERTIFICATE OF CORRECTION

PATENT NO. : 11,516,286 B2
APPLICATION NO. : 16/368290
DATED : November 29, 2022
INVENTOR(S) : Kipp et al.

It is certified that error appears in the above-identified patent and that said Letters Patent is hereby corrected as shown below:

In the Specification

Column 6, Detailed Description, Line 35:
After "region.", delete "¶" therefor

Column 13, Detailed Description, Line 66:
Delete "345)." and insert --340).-- therefor Column 16, Detailed Description, Line 5:
After "305.", delete "¶" therefor Signed and Sealed this
Ninth Day of January, 2024

Katherine Kelly Vidal
*Director of the United States Patent and Trademark Office*